United States Patent [19]

Stieff

[11] 4,130,341

[45] *Dec. 19, 1978

[54] FIBER OPTIC SEAL APPARATUS

[76] Inventor: Lorin R. Stieff, P.O. Box 263, Kensington, Md. 20795

[*] Notice: The Portion of the term of this Patent subsequent to Aug. 15, 1995, has been disclaimed.

[21] Appl. No.: 768,434

[22] Filed: Feb. 14, 1977

Related U.S. Application Data

[63] Continuation-in-part of Ser. No. 733,177, Oct. 18, 1976.

[51] Int. Cl.² .................................................. G02B 5/16
[52] U.S. Cl. .................................... 350/96.20; 70/440; 350/96.24
[58] Field of Search ................ 350/96 B, 96 R, 96.20, 350/96.24; 70/440

[56] References Cited

U.S. PATENT DOCUMENTS 3,503,666  3/1970  Moore et al. ..................... 350/96 B
3,854,792  12/1974  Koelle ............................ 350/96 B

*Primary Examiner*—John K. Corbin
*Assistant Examiner*—Stewart Levy
*Attorney, Agent, or Firm*—James C. Wray

[57] ABSTRACT

A fiber optic seal having a block with similar fiber spreading inserts and similar fiber combining inserts which terminate in rectangular facial fiber openings. The block is placed on alignment lugs and a rectangular reticle is precisely moved by a micrometer in front of the light source to illuminate the one group of fiber ends. The second group of ends in the block is observed through an observing device mounted in an angle in the housing parallel to a handle which includes a power source.

12 Claims, 3 Drawing Figures

FIBER OPTIC SEAL APPARATUS

This is a continuation in part of copending application Ser. No. 733,177 filed Oct. 18, 1976.

BACKGROUND OF THE INVENTION

Officials responsible for the accountability and physical security of materials have recognized for a number of years the need to develop a secure, tamper-resistent indicating seal whose integrity and unique identity could be established in the field without removal or disassembly. A need has been also identified for a secure sealing system that could be continously and remotely monitored.

A new class of sealing devices, a fiber optic seal, has been described in which the typical sealing wire or tape was replaced with a glass fiber optic bundle. The seal was made by enclosing the two ends of the fiber bundle in a frangible, stressed glass clasp or by removing the protective plastic jacket from the bundle ends and holding the twisted glass fiber ends together with a metal collar. The optical integrity and continuity of the fiber optic loop could be checked after assembly by noting the transmission of light through the bundle. The unique identity or fingerprint of the seal could be established at the time the seal was assembled in the field by recording the random pattern of the ends of the glass fibers in the bundle. It was suggested that, if part of the bundle was illuminated, a random pattern of dark and illuminated fiber ends would be produced which could be photographed in the field using a portably hand-held photomicrographic instrument. A direct comparison of a negative taken at the time of the assembly of the seal with a positive print taken at a later date would provide the highest level of confidence if it must be established that a seal left unattended and unexamined for a significant interval of time has not been compromised.

In principle, the high degree of security which is offered by fiber optic sealing devices depends upon several features:

A unique fingerprint is generated by the completely random pattern of the ends of the optical fibers. The uniqueness of this fingerprint is further enhanced by the imperfections in shape and optical characteristics of the individual fibers in the bundle.

It is necessary to destroy the fingerprint during any disassembly of the seal.

A formidable problem is encountered in any effort to duplicate this unique fingerprint should the original seal be replaced with a substitute.

An equally formidable problem exists in re-establishing not only the light transmitting capabilities of the individual fibers interrupted in the process of cutting the fiber bundle, but also the wide range of light intensities transmitted by the different fibers in the bundle.

The seals enable verification of the optical integrity of the fiber bundle as the whole as well as the integrity of each individual fiber in the bundle.

SUMMARY OF THE INVENTION

The new fiber optic sealing system of the present invention differs from the earlier fiber optic seals. The seal employs either commercially available or specially prepared glass or plastic optical fiber bundles, and a metal or plastic fiber locking assembly block. This hexagonally shaped block holds the fiber bundle securely in place against accidental disassembly and includes internal components which insure the complete mutual interpenetration of the fibers at the end of the bundle.

To assemble this type of fiber optic seal in the field, an appropriate length of the fiber bundle is cut and a tapered collar is placed on one end of the fiber bundle. Using the special cutter incorporated in the assembly tool, approximately one and a quarter inches of the protective plastic jacket is removed from the end of the bundle. The stripped end of the fiber bundle is then fully inserted into one of the two cylindrical holes in the bottom edge of the hexagonal fiber locking assembly block and is secured by seating the tapered collar with the special seal assembly tool.

The remaining free end of the fiber bundle is passed through the special openings in the item to be sealed, and a second tapered collar is placed over the jacketed end of the bundle. Approximately one and a quarter inches of the protective jacket is removed, and the free end of the fiber bundle is similarly inserted in the second cylindrical hole in the assembly block and secured.

In routine use, seals are partially assembled during manufacture, and the plastic jacket on the free end is pre-cut but not stripped. To complete the seal, the free end of the bundle is threaded through the item to be sealed, and a tapered collar is placed over the jacketed end of the bundle. The pre-cut plastic jacket is removed; the stripped fiber bundle is inserted into the remaining opening in the seal assembly block, and the tapered collar is sealed with the assembly tool.

The internal components of the fiber locking assembly block are designed to flatten the stripped fiber bundle ends into fan shaped arrays of fibers so that the fibers from one end of the bundle may easily intersect and may pass randomly in between the fanned fibers of the other end. The ends of the fibers above the intersection appear in the holes at the top or exit edge of the assembly block. The fibers in the two fans are recombined into two individual bundles by modified tapered collars analogous to those used to secure the jacketed fiber bundle at the base of the fiber locking assembly.

Identity of the seal is established in the field by using a small, hand-held microscope and illuminator. The completely assembled seal is placed in the indexing stage of the field microscope. One end of the fiber bundle is illuminated, for example, by light from a pen-sized flashlight through a 60° prism or mirror. All of the fiber ends are illuminated by this reflected light with the exception of those fibers lying directly under a reticle containing at least one opaque line, whose width is approximately equal or slightly larger than the diameter of the optic fibers used in the fiber bundle. This reticle may be moved across an end of the bundle. In this manner the light entering every fiber in the bundle may be controlled. A provision is made for measuring the position of this reticle. The light transmitted through the fibers and emerging at the opposite end of the bundle is magnified and optically examined with the field microscope. The position of a selected, small set of individual fibers may be measured using the eyepiece reticle and recorded along with the seal's serial number. This position data may be supplemented by additional observations on the size, color, imperfections, and optical transmission properties of the individual fibers. Such data obtained on a small, well dispersed number of fibers (approximately 5) is sufficient to uniquely identify a seal and provides reasonable assurance that substitution or counterfeiting of a seal could not go undetected.

Alternatively, a photomicrograph is taken of the random pattern formed by the fiber ends in the field of view of the microscope using a Polaroid or film camera. The photographic procedure is recommended where the highest level of confidence is required and when it must be determined that a seal left unattended and unexamined for significant intervals of time has not been compromised.

If there is a requirement to continuously monitor a fiber optic seal, the fiber locking assembly block is inserted into a solid state monitoring device. The monitor contains a pulsed light emitting diode light source which is used to illuminate one end of the fiber bundle. A photo-transistor circuit detects the light transmitted through the fiber optic loop, and a microprocessor with the necessary associated components generates and displays or transmits on demand a time ordered random number. Interruption of the light transmitted through the fiber optic bundle, harassment of the electronic monitor, or electronic failure clears the random number generator with only the last undisturbed number remaining in the memory of the unit. These electronic components are housed in a small, secure, tamper-indicating container, such as a stressed glass cup. The order of the random number generated within the monitor is known only to the organization which has installed the seal. The random number sequence generated by each seal is, of course, also unique to that seal alone. The random number generated by the monitor is displayed on demand to either the inspector or the facility operator where the seal is installed, or the number is transmitted to the organizational headquarters.

The fiber optic seal and inspection apparatus of the present invention is similar to the fiber optic seal and inspection apparatus described and claimed in patent application Ser. No. 733,177, filed Oct. 18, 1976 by Lorin R. Stieff, with the following exceptions and additions.

The seal block shown in FIGS. 2 and 5 of the previous application differs from the present seal block in that the internal members of the block shown in FIG. 1 of the present disclosure have two similar interengaging structures, with an integrated collet having a rectangular opening at the facial end and with internal members having shoulders to prevent excessive entry into the block and being similarly constructed at the fiber optic bundle receiving end of the block.

The inspection apparatus of the present invention is improved by an improved light source for directly illuminating one facial area of the block and by a micrometer which is connected to an improved rectangular reticle which is interposed between the light source and the block and by an improved microscope.

In one form of the present invention, the microscope is replaced with a direct reading photoimager. In another form of the present invention the microscope is replaced with a direct reading electronic reading imager.

In one form of the invention, scanning of the fiber ends upon illumination through a reticle is accomplished by television cameras and similar devices. As an example, one form of scanning uses a Fairchild charged couple array having elements within the array spaced on 0.0005 inch centers.

In another embodiment of the invention, both illuminating and scanning are accomplished by electronic means and specifically by cathode ray tube and charged couple illuminating and scanning means.

One of the objects of the invention is the provision of a fiber optic seal having a block, crossed pathways within the block, the pathways having fiber bundle receiving openings and fiber end holding openings in spaced relationship on facial areas of the block, bundle holders connected to the block for holding an optic fiber bundle in pathways within the block and fiber directing means mounted within the block, and facial collet means having rectangular openings for holding the ends of fibers in tight rectangular configuration.

Another object of the invention is the provision of a fiber optic seal with first and second spreaders mounted in first and second passageways near an intersection of the passageways for receiving the fiber optic bundles and for orienting fibers in the bundles in laterally spread position and wherein the spreaders have shoulders for preventing excessive insertion into passageways.

A further object of the invention is the provision of a fiber optic seal with first and second spreaders which are identical.

A still further object of the invention is the provision of a fiber optic seal having a fiber optic bundle with a first end positioned in one of the pathways and spreading means, having a medial portion extending from the block and a second end remote from the block.

Still another object of the invention is the provision of a fiber optic seal with similar converging portions.

A further object of the invention is the provision of a means for mounting the block in a holder with one opening of each passageway extending toward the holder, and which holder has a rectangular reticle means for communicating a light source from the holder through the rectangular reticle into one facial opening in the block.

Another object of the invention is the provision of a means for mounting the block in a holder with one opening of each passageway extending toward the holder, which holder has a rectangular reticle means for communicating a light source from the holder through the rectangular reticle into one facial opening in the block.

Still another object of the invention is the provision of a rectangular reticle and means for sliding the rectangular reticle which selectively controls light for selective illuminating the optic fiber termini in the one facial opening of the block.

Yet another object of the invention is the provision of a fiber optic seal having a sliding means with a micrometer connected to the means for interposing reticle mounting means for moving the reticle by turning the micrometer.

A further object of the invention is the provision of a fiber optic seal having an observation adaptor connected to the mounting means with an observation means mounted on the adaptor.

Another object of the invention is the provision of a fiber optic seal having a housing connected to the mounting means and a power source connected to the mounting means and a light mounted in the housing adjacent the reticle and connected to the power source.

Still another object of the invention is the provision of a fiber optic seal having observation means which is a microscope which extends into the mounting means with a power source having a tubular handle connected to the mounting means parallel to the microscope.

Referring to the drawings.

Figure 1:
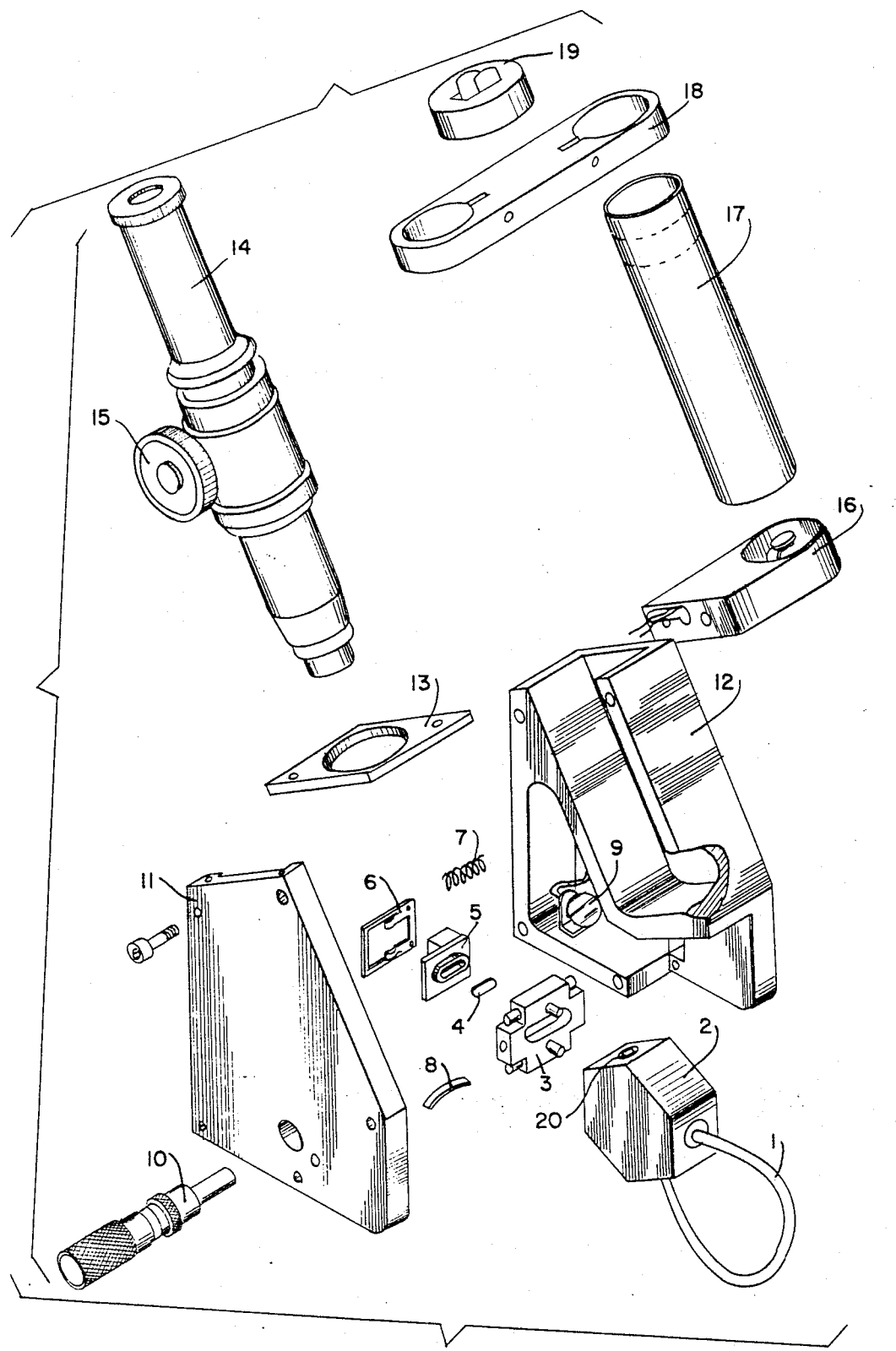
FIG. 1 is an exploded view of the fiber optic seal and inspection instrument.

Referring to the drawings, a fiber optic seal is generally referred to by the numeral 1. Seal 1 includes a fiber orienting block 2 which engages the reticle slide assembly housing 3. The block 2 has facial collets with rectangular openings 20 for holding the ends of the fibers in tight rectangular configuration. A reticle 4 is positioned within a reticle mount slide 5 which is urged forward by a forward preload spring 6, and which is urged to the left by slide return spring 7. A vertical preload spring 8 is mounted beneath the slide, keeping the slide tightly in selected position and preventing unintentional movement of the slide.

A light source 9 illuminates a face of the fiber seal block 2 through reticle 4.

Micrometer spindle slide actuator 10 is secured in a side of the housing and engages a rearward directed lug on reticle mount slide 5. The right side 11 of the housing securely receives the casing of micrometer 10 to permit the spindle to accurately move the reticle slide 5.

The left side 12 of housing which includes the lamp and fixtures of the battery support is secure to the right side of the housing by four bolts.

The fifth bolt hole in side 11 draws the reticle slide assembly housing 3 tight against the right side, pulling the projecting rectangular piece and parallel starts into complementary recesses within the right side 11. A similar fixed mounting is provided on the left side.

An adapter plate 13 is secured at the top of the housing with four bolts and a microscope assembly 14 is mounted on the adapter plate, preferably by threading a medial portion of the microscope into a tapped opening in the center of the adapter plate. The focusing knob 15 is used to directly focus the image from the upper face of fiber seal block 2.

A lower mounting bracket handle 16 is connected to the left side 12 of the housing by bolts which are threaded into the mounting bracket 16 from inside the handle. The mounting bracket contains electrical wires and a central contact which is positioned to contact batteries within handle and power source enclosure 17. An upper mounting bracket 18 is placed over an upper end of the microscope and over an upper end of power source enclosure 17, and bolts are inserted laterally through the upper mounting bracket to tighten the split opening about the microscope 14 and the handle and power source enclosure 17.

The cap 19 which includes an on-off switching assembly is screwed on to the power source enclosure 17, completing the assembly.

Figure 3:
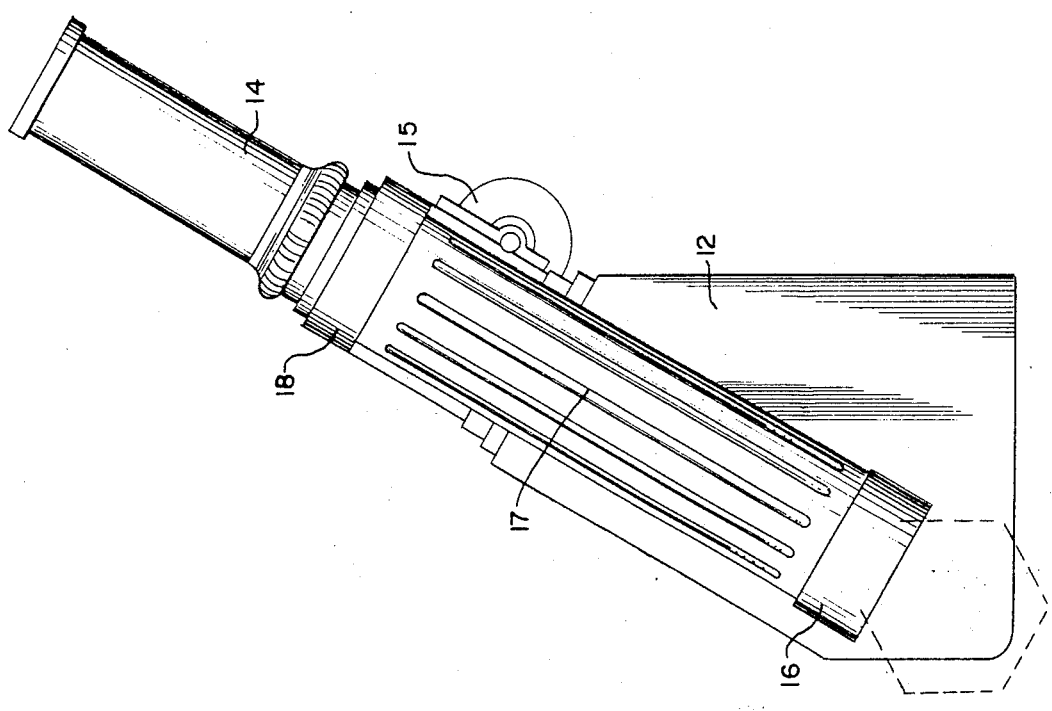
FIG. 3 is a side elevation of the inspection instrument.
Figure 2:
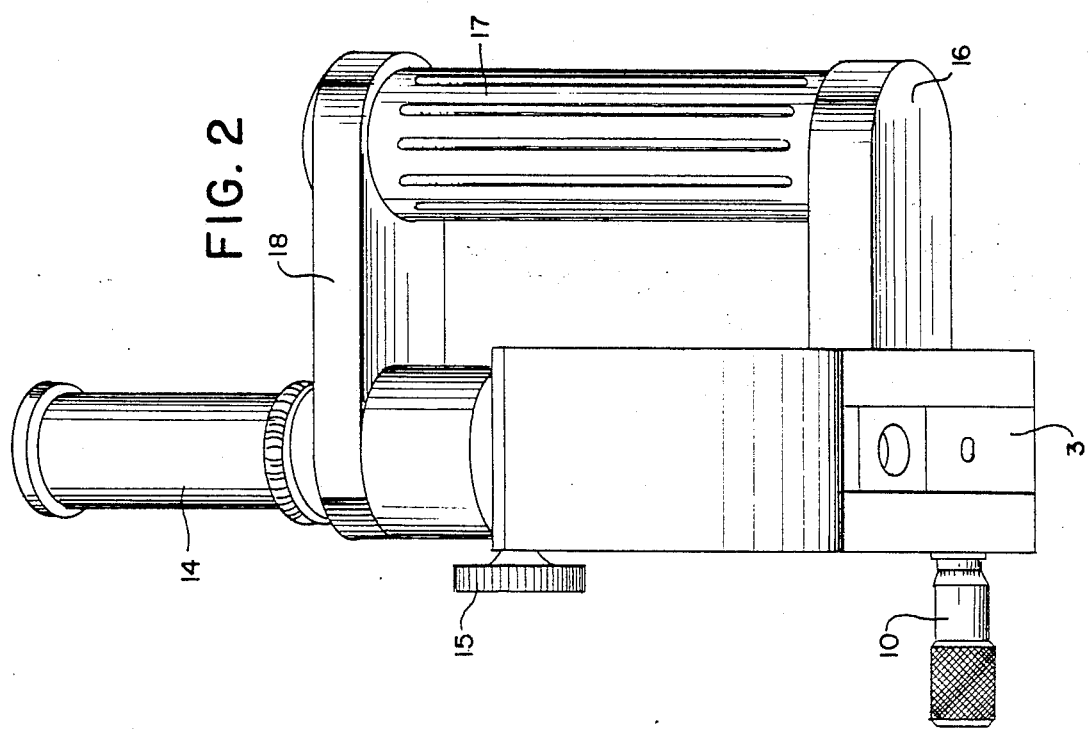
FIG. 2 is an assembled view in front elevation of the inspection instrument.

The structure shown in frontal view in FIG. 2 and in side view in FIG. 3 illustrates the assembled inspection apparatus.

I claim:

1. Fiber optic seal apparatus comprising a block, first and second pathways crossed within the block, the pathways having fiber bundle receiving openings and fiber end holding openings in spaced relationship on facial areas of the block, bundle holding means connected to the block for holding an optic fiber bundle end inserted in each pathway with portions of the fibers near one end of the bundle threaded between portions of the fibers near the opposite end of the bundle in random arrangement within the block and fiber directing means mounted within the block, and facial collet means having rectangular openings for holding the ends of fibers in tight rectangular configuration.

2. The apparatus of claim 1 further comprising means for mounting the block in a holder with one opening of each passageway extending toward the holder, and wherein the holder has a rectangular reticle means for communicating a light source from the holder through the rectangular reticle into one facial opening in the block.

3. The fiber optic seal apparatus of claim 2 wherein the rectangular reticle and means for sliding the rectangular reticle for selectively controlling light for selective illumination of optic fiber termini in the one facial opening of the block.

4. The fiber optic seal apparatus of claim 3 wherein the sliding means comprises a micrometer connected to the means for interposing reticle mounting means for moving the reticle by turning the micrometer.

5. The fiber optic seal apparatus of claim 2 further comprising an observation adapter connected to the mounting means and an observation means mounted on the adapter.

6. The fiber optic seal apparatus of claim 5 further comprising a housing connected to the mounting means and a power source connected to the mounting means and a light mounted in the housing adjacent the reticle and connected to the power source.

7. The fiber optic seal apparatus of claim 6 wherein the observation means is a microscope extending into the mounting means and wherein the power source comprises a tubular handle connected to the mounting means parallel to the microscope.

8. The fiber optic seal apparatus of claim 1 wherein the fiber directing means comprise first and second spreading means mounted in first and second passageways near an intersection of the passageways for receiving the fiber optic bundles and for orienting fibers in the bundles in laterally spread position and wherein the spreading means have shoulders for preventing excessive insertion into the passageway.

9. The fiber optic seal of claim 8 wherein the first and second spreading means are identical.

10. The fiber optic seal apparatus of claim 8 further comprising a fiber optic bundle having a first end positioned in one of the pathways and spreading means having a medial portion extending from the block and having a second end remote from the block.

11. The fiber optic seal apparatus of claim 1 wherein the directing means comprise first and second converging portions having rectangular cross-sections.

12. The fiber optic seal apparatus of claim 11 wherein the converging portions are similar.

* * * * *